(12) United States Patent
Carabajal (10) Patent No.: US 9,341,866 B2
(45) Date of Patent: May 17, 2016

(54) SPECTACLES HAVING A BUILT-IN COMPUTER

(76) Inventor: Sergio Martin Carabajal, Quito (EC)

( * ) Notice: Subject to any disclaimer, the term of this patent is extended or adjusted under 35 U.S.C. 154(b) by 27 days.

(21) Appl. No.: 14/349,085

(22) PCT Filed: Jul. 10, 2012

(86) PCT No.: PCT/EC2012/000026
§ 371 (c)(1),
(2), (4) Date: Apr. 2, 2014

(87) PCT Pub. No.: WO2013/159785
PCT Pub. Date: Oct. 31, 2013

(65) Prior Publication Data
US 2014/0253866 A1    Sep. 11, 2014

(30) Foreign Application Priority Data

Apr. 24, 2012    (AR) .......................... P 20120101416

(51) Int. Cl.
*G02C 5/14*    (2006.01)
*G02C 11/00*   (2006.01)
*G06F 3/01*    (2006.01)
(Continued)

(52) U.S. Cl.
CPC .............. *G02C 11/10* (2013.01); *G02B 27/017* (2013.01); *G02C 5/143* (2013.01); *G06F 1/203* (2013.01); *G06F 3/011* (2013.01); *G02B 2027/014* (2013.01); *G02B 2027/0138* (2013.01); *G02B 2027/0178* (2013.01)

(58) Field of Classification Search
CPC ........ G02C 5/143; G02C 11/00; G02C 3/003; G02C 5/20; G02C 5/16; G02C 11/10; G02C 5/00; G02C 2200/02; G02C 2200/08; G02C 2220/16; G02C 3/006; G02C 11/02; G02C 5/126; G02C 5/14; G02C 2200/10; G02C 5/008; G02C 5/2272; A61F 11/12; A61F 9/027; A61F 9/029; A61F 11/08; A61F 2210/0014; A61F 9/028; A61F 9/045; A61F 11/14

See application file for complete search history.

(56) References Cited

U.S. PATENT DOCUMENTS 5,281,957 A    1/1994  Schoolman
5,594,573 A    1/1997  August
(Continued)

FOREIGN PATENT DOCUMENTS

CA    2256920    8/1999
CA    2388766    12/2003
(Continued)

*Primary Examiner* — James Greece
*Assistant Examiner* — Sharrief Broome
(74) *Attorney, Agent, or Firm* — Defillo & Associates, Inc.; Evelyn A Defillo (57) ABSTRACT

Spectacles with a built-in computer that include a curvilinear frame that is defined by a frontal anterior face with opaque panels of high impact materials and another posterior counter-front face. This frame is linked in a solidarity manner with a set of temples that are prolongations on each side of the frame. The frame contains at least two peripheral visors, one upper visor and one lower visor, distant from each other, that define an enclosure together with the concave posterior counter-front face of the frame. This enclosure contains a set of elements defined by: a central printed circuit block, a cooling block, a battery and coolant circulation conduits. In collaboration with the aforementioned elements, the enclosure also contains: at least one LED screen and a convex lens with a bridge that supports the frame on the user's nose.

8 Claims, 4 Drawing Sheets

(51) Int. Cl.
    *G02B 27/01*    (2006.01)
    *G06F 1/20*    (2006.01)

(56) References Cited

U.S. PATENT DOCUMENTS

| | | | |
|---|---|---|---|
| 5,622,222 A * | 4/1997 | Wilson et al. | 166/105.4 |
| 2002/0067367 A1 | 6/2002 | Kosugi | |
| 2002/0101568 A1 | 8/2002 | Eberl et al. | |
| 2002/0163486 A1 * | 11/2002 | Ronzani et al. | 345/87 |
| 2005/0264755 A1 * | 12/2005 | Dietz | 351/112 |
| 2006/0090135 A1 | 4/2006 | Fukuda | |
| 2009/0296982 A1 * | 12/2009 | Dolloff | 382/100 |
| 2010/0060855 A1 * | 3/2010 | Graether | 351/206 |
| 2010/0326628 A1 * | 12/2010 | Campbell et al. | 165/104.21 |

FOREIGN PATENT DOCUMENTS

| | | |
|---|---|---|
| CN | 2490637 | 5/2002 |
| CN | 2569109 | 8/2003 |
| DE | 102009034153 | 2/2011 |

* cited by examiner

SPECTACLES HAVING A BUILT-IN COMPUTER

CROSS REFERENCE TO RELATED APPLICATION

This application is a national stage entry of PCT/EC2012/000026 filed Jul. 10, 2012, under the International Convention claiming priority over Argentinean Patent Application No. P20120101416 filed Apr. 24, 2012.

TECHNICAL FIELD OF THE INVENTION

The present invention relates to the field of "spectacles" that contain a personal portable computer with a screen inside one of the spectacles which simplifies, improves, and saves the use of a personal computer that is linked and interacts with external devices and connectivity to the Internet, via wired and wireless systems.

BACKGROUND OF THE INVENTION

In general and as it is known, there are many types of laptops and display setups for use in the above-mentioned fields, as well as computational systems for personal and commercial use. These management systems have been designed for the purpose of providing an easy, fast, safe and reliable operation in word processing, video gaming, video-conferencing (bi-directional, audio-video simultaneous communications), data processing, graphic design, surgical operations and wireless Internet access.

Among these configurations, they rely on limited computational systems and portable screens that include a limited and old linkage between the user and the external portable computer.

The existing technologies rely on the user using a portable computer such as a laptop, a netbook, MP4; MP5; etc., and/or a smartphone in order to obtain personal and/or commercial connectivity. Also, current technologies have as an objective to be used for surgical monitoring operations or for being used as head-mountedspectacles to be used by fighter pilots.

The known inventions rely on different solutions, however with the solution that the present invention provides, the user obtains the enhanced features of a laptop.

Also, the inventor recognizes in the prior art, the following technical published documents which deserve to be noted given their importance, among which can be cited:

U.S. Pat. No. 5,281,957A, refers to a spectacle divided longitudinally into two parts. The top part has a LCD screen while the bottom part provides an outside view. The images and the sounds in the headphones, systems, etc., are transmitted from the outside by means of a connection to a personal computer. The present invention does not rely on an external personal computer, since the invention has built in all of the necessary elements.

CA Patent No. 2,256,920 A1, refers to a spectacle that includes a camcorder within its frame. For its operation, this invention requires external equipment such as a laptop or a personal computer that sends the information to the screen. The camera, built into the frame, receives and sends information to the personal computer in an autonomous way.

U.S. Patent Application Publication No. 2002/0067367 A1, refers to a spectacle with a liquid crystal display screen that receives all the information from an external source, connected to a portal, for example, of TV channels. Data from the keyboard (remote control) is received through an external infrared signal.

U.S. Patent Application Publication No. 2002/163486 A1, refers to a spectacle that allows the user to see images on its liquid crystal display screen that are supplied by a personal computer or a video camera. The visual images come from the exterior to the same screen.

U.S. Pat. No. 5,594,573A, refers to a spectacle with a screen that contains an electronic circuit of energized crystals, that allows the user to view animated images. The images viewed cannot be reproduced, saved or stored. This spectacle does not offer internet connectivity or any type of wired or wireless connectivity.

U.S. Pat. No. 6,091,546, refers to a spectacle that films and records with an external microphone and a camera. The screen, located on one of the lenses, is connected to a video source. The other lense allows the user to see directly outside. This invention has a video camera and a microphone built into the frame of the spectacles.

CA Patent No. 2,388,766 A1, refers to a screen having a linear bar in the spectacle. These spectacles receive "pager-like" information, for example, time, appointments, etc. From above and from below the information bar, the user can view the exterior.

DE Patent No. 02009034153 A1, refers to a laptop connected to a spectacle. The spectacle displays images sent by the external equipment. The computer has a keyboard and video spectacles with a screen for both eyes. The keyboard is filmed and the image of the keyboard is displayed on the lenses of the spectacles. The visual field of the videospectacles allows the user to view the keyboard. The computer is adequate for text and data processing and possible Internet use. The computer is portable and is equipped with a battery.

All of the aforementioned patent publications are characterized by the use of spectacles that rely on external information systems for data transmission to an integrated screen into the spectacles. Other patents integrate a sound system as well. In some cases, the spectacles have built-in devices that transmit multimedia information to an external source for its processing and storage, including rudimentary controls of the external source.

The solution provided in the present invention includes "spectacles with a built-in computer" that are made of high impact materials. The spectacles are characterized by having internal electronic components with materials technology and individual characteristics, with computer programs that by interacting among them, are used together with a personal computer with wireless Internet connection, with innovative features such as portability, vision range, complete isolation from the environment, privacy, connectivity to wired and wireless linkage systems, and audiovisual synchronization with devices of similar characteristics.

The following paragraphs will clearly illustrate how these and other objectives and advantages of the invention are reached in practice. We will refer to the detailed description and drawings of certain features of the invention. These features have been highlighted as an example. The invention claims are not limited to the features exemplified.

BRIEF DESCRIPTION OF THE DRAWINGS

Figure 1:
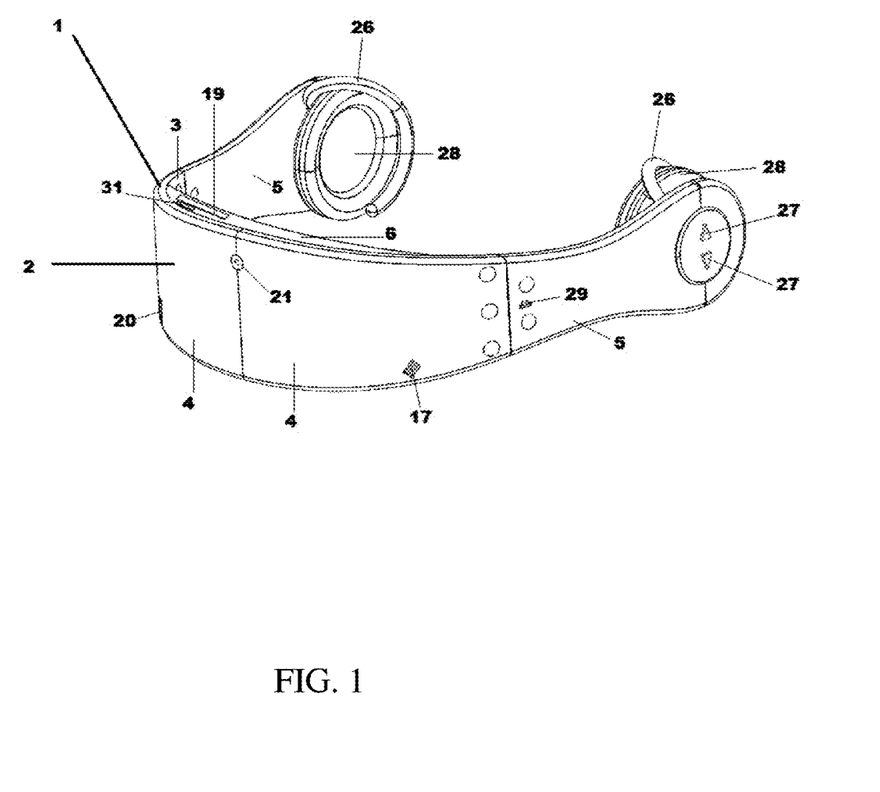
FIG. 1, illustrates a perspective view of the present invention.
Figure 2:
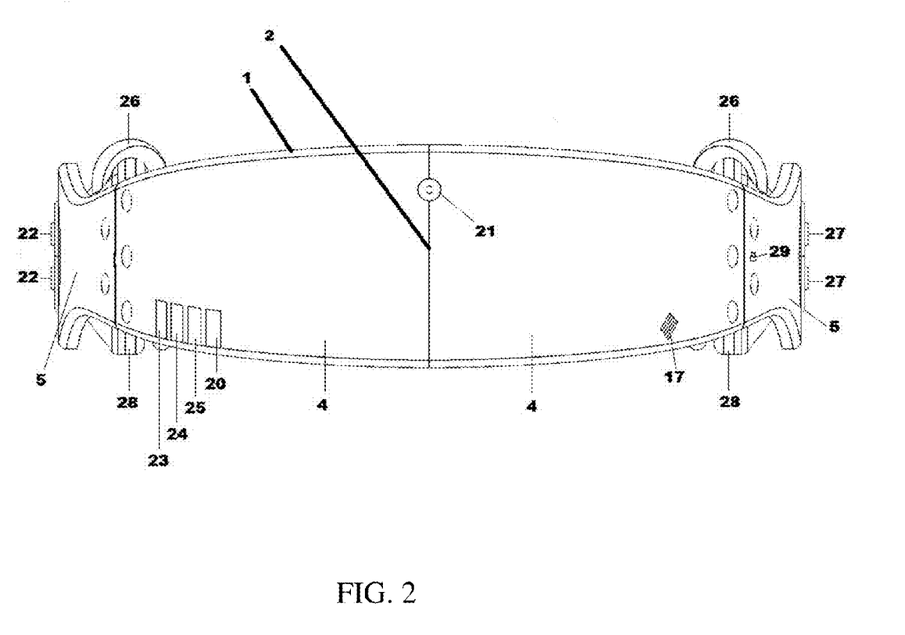
FIG. 2, shows a front view of the invention.
Figure 3:
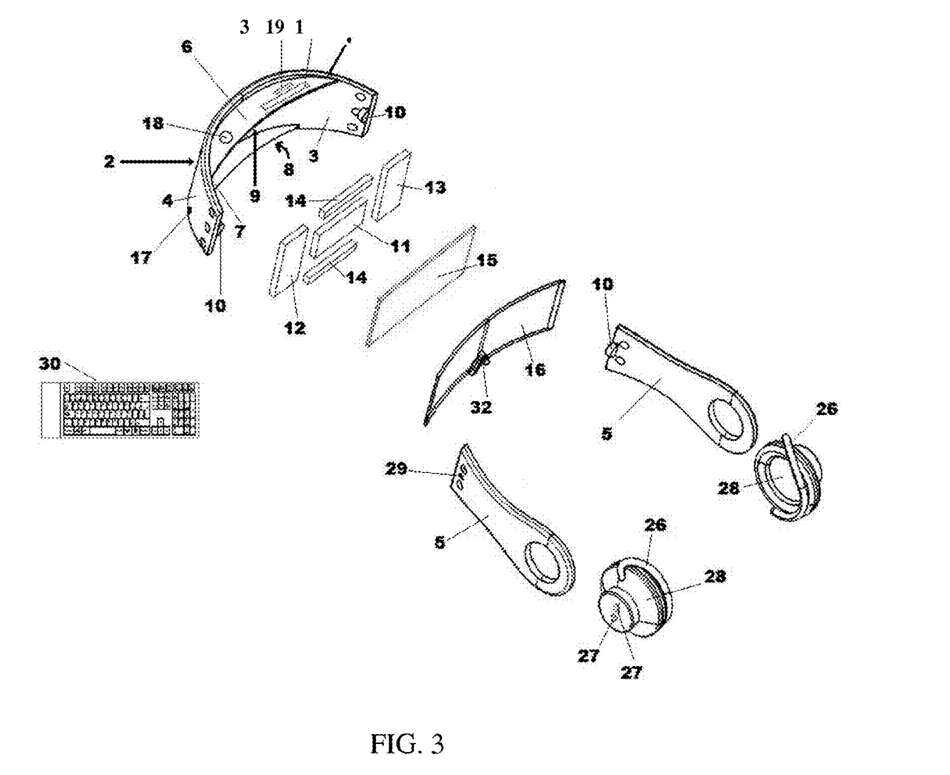
FIG. 3, illustrates an expanded view of the invention.

In FIGS. 1 to 3, the same reference numbers indicate the following elements:

1. Frame or mount of the spectacles.
2. Front face.
3. Posterior face.
4. Removable opaque panels.
5. Temples.
6. Upper visor.
7. Lower visor.
8. Enclosure.
9. Inner wall of the posterior face.
10. Neodymium magnets.
11. Printed circuit main block.
12. Cooling block.
13. Battery.
14. Coolant circulation ducts.
15. LED Screen.
16. Convex lens.
17. Microphone.
18. Camera shutter button.
19. Battery in/out compartment.
20. Bluetooth reception antenna.
21. Webcam.
22. Volume control.
23. On/off switch.
24. WiFi antenna.
25. 3G antenna.
26. Temple hooks for right and left ear.
37. Zoom switch.
28. Speaker/earphone left and right.
29. USB hub.
30. Wireless portable keyboard.
31. Micro-SD memory
32. Nose support bridge.

DETAILED DESCRIPTION OF THE INVENTION

Figure 4:
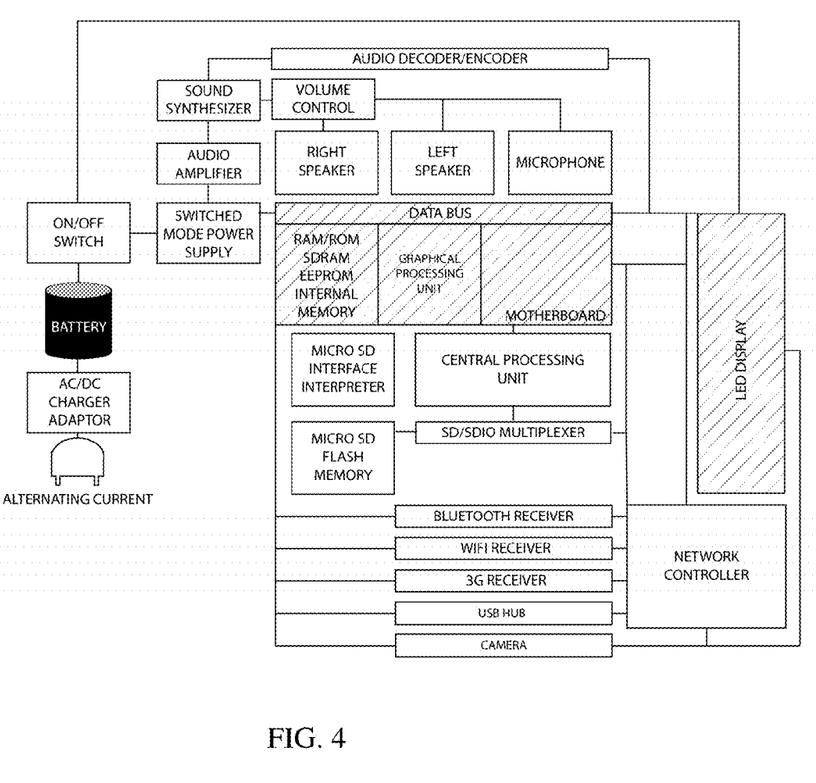
FIG. 4, illustrates a block diagram that describes the principle of operation of the invention.

In FIG. 4, the description of the block diagram is as follows:

AC Plug:

It provides AC power for the entire system, drawing from 110v/60 hz up to 220V/50 Hz from the power line and delivers it to the AC/DC adaptor charger.

AC/DC Adaptor Charger:

The charging system allows to receive AC current and, through a transformer, converts the AC current to DC system, delivering 9v 350 mA DC to the system, which is necessary for the functioning of the system. At this point, the current is delivered to a storage on a lithium ion battery, which also contains a security phase based on an electronic fuse and a diode in order to protect the system against power surges.

Lithium Ion Battery:

It is the energy core for the entire system, responsible for drawing and storing the DC current in cells capacitated to work with DC current, and for delivering the current upon request of the on/off switch.

On/off Switch:

This switch is responsible for permitting or denying the current flow to the device and, therefore, allows to turn the device on or off, properly derived to the DC/DC power switch.

DC/DC Power Switch:

It is the device responsible for switching the DC current coming from the battery, in DC format, and regulates the different rates, both for audio amplifier current, as well as for the different phases within the motherboard and the different receptors: webcam, WiFi receiver, 3G receiver, USB hub, and Bluetooth reception antenna.

Audio Amplifier:

This is the first stage of the audio-sound system. It is responsible for raising the current signal and adapting it to the requirements of the left and right speakers, the microphone, the sound tuner signal, and the proper regulation of the volume control.

Audio Synthesizer:

At this stage, the electronic processing of sound occurs, its frequency, the speech synthesis, and the electrical currents necessary to produce vibrations in the speakers. All these functions are first processed in the audio decoder/encoder and the digital current regulator that delivers the current to the listening device, i.e. the volume control device.

Volume Control Device:

Includes a digital potentiometer in two instances, responsible for both, the regulating of the signal level received from the microphone, as well as the signal level delivered to the speakers.

Audio Decoder/Encoder:

This system is responsible for the conversion between the different media and formats. Among these we find WAV (Waveform Audio), OGG (last name of the Inventor of the format), MP3 (MPEG 3, Moving Picture Experts Group 3) and MP4 (MPEG4 Moving Picture Experts Group 4), to allow all audio media functions, both for voice recognition, video formats audio, and the output to the speaker for music content. Also, the audio decoder/encoder is responsible for modifying the compression bit rate of this media, allowing the interaction with the MICRO SD card, through the data bus located on the Motherboard, emitting an intermittent analogic signal that is transformed into a notification on the LED screen.

Left and Right Speakers

This output device receives the audio signals based on the level set by the volume control, and reproduces these signals through the speakers, providing also a similar functionality as the webcam, in its audio format, and allows hearing to all the media obtained from the audio synthesizer. If the user requires, it can also obtain a direct relationship with the microphone, and therefore record the user's own voice and/or it can record auditive awareness of the user's environment. The stereo system, or Dolby Surround system, ensures a positioning system for the directionality of the sound, allowing a frontal, lateral and back perspective.

Microphone:

This input device captures the vibrations of voice and the environment, converting these vibrations into data through the audio synthesizer, and setting the signal level through the volume control. The microphone can be used for recording, for communication and for interaction with other users through instant messaging systems contained in the operating system.

Data Bus:

This is the main link between data flow and routing. The data bus is responsible for delivering and distributing the information, regardless of its nature, between the reading memory, the graphics processing unit for the treatment of images, and the motherboard, responsible at the same time for delivering of all logical operations that integrate the operating system of the main system.

Random access memory (RAM)/Read only memory (ROM)/Synchronous dynamic random access memory (SDRAM)/Electronically erasable read only memory (EE-ROM):

This is the storage of the guidelines and the internal operations of the system, containing a continuous storage of the manufacturer's programmable memory (necessary for starting the operating system and for its functionality) and the commands used in all the functions of the general system. These commands are delivered to the graphic processing unit and to the motherboard, and at the same time they are delivered to the central processing unit when the operations are of a digital logical nature. At the same time, it delivers the index of memory addresses hosted in the external Micro SD memory.

MicroSD Flash Memory:

This device is external to the general system, stores all the data, software, and the multimedia files. Given their diverse nature, the multimedia files are processed by the MicroSD interface interpreter. When processing directives and logical operations, they are previously decoded by the SD/SDIO multiplexor.

MicroSD Interface Interpreter:

This small device is responsible for the conversion of the data stored on the Micro SD card into a language that is interpretable by the RAM memory of the main system, obtaining from it the audiovisual media that is finally delivered to the motherboard, and from the motherboard, the audiovisual media is delivered to the LED screen for its visualization.

SD/SDIO Multiplexer:

This system allows the correct adaptation of the logical instructions coming from the software that are stored on the Micro SD card, in order to be processed by the central processing unit. This instance is necessary in order to allow a wider range of instructions, given the limitations of the original and native of the main system.

Graphics Processing Unit:

This independent processing system, called GPU, is responsible for codification and treatment of static images and the visual content, through its own processing unit, lessens the burden of the CPU load, and focusing on a unique task, allowing a better development and efficiency of the main system.

LED Screen:

This light-emitting diode screen receives current directly from the on/off switch, because it is designed for a constant demand of 9V DC current and enabling the main system a virtually instant shutdown. The LED screen is responsible for visual representation of the indications and instructions received from the motherboard, through the data bus.

Motherboard:

It is responsible for starting and maintaining all secondary or dependent processes of the main system. The motherboard communicates via the data bus by sending logical orders to the central processing unit; storage instructions to the Micro SD device interpreter; images to the graphics processing unit; and coordinates the orders sent to the audio-video system. The motherboard contains all the high-level integrated circuits that constitute the actual hardware of the main system.

Network Controller:

This device functions as a complement to the data bus, responsible for digitally expressing the signal or information received from the 3G, WIFWiFi, USB and Bluetooth receivers and hubs, connecting different input formats with a unique output to the data bus, providing the necessary connectivity of the main system to the Internet, or linkage devices with other systems of similar connectivity. The network controller also allows the reception of multimedia that is subsequently processed by the multiplexer and stored on the Micro SD memory, or it can be diverted following instructions to the central processing unit, such as the webcam, and its functionality of the recording environment that surrounds the user.

Central Processing Unit:

This component is responsible for processing the arithmetic logical operations, interpreting the instructions sent from the motherboard and from the SD/SDIO multiplexer, the programs contained in the external memory card, processing data and information contained therein. It provides the main and vital function of the main system programming.

Webcam:

The webcam provides two native functions that could be expanded through software to virtually endless possibilities. The first functionality is to record the environment and the ability to zoom in and out in order to obtain a sharp and detailed vision. The second is the ability to interact with instant messaging systems.

Zoom:

System of variable focal distance that allows the user to enlarge or reduce the images obtained from the webcam and offers a maximum capability of 8 factors of enlargement (8×), offering an enhanced vision and the possibility to focus on objects from a distance. This capability allows the user to take photographs or to actively participate in elements that fall outside of the reach of unaided human eyesight.

Camera Shutter Button:

Digital switch which links directly with the webcam, allowing its immediate activation with a limited exposure time, which generates a virtual picture of what lies in the range of vision of the camera.

Bluetooth Receiver:

This receiver is responsible for obtaining data and files thanks to the connectivity characteristics of the system, also allowing the use of an external modem to provide access to the Internet.

WiFi Receiver:

This receiver is responsible for obtaining data and files thanks to the connectivity characteristics of the system, also allowing the use of an external modem to provide access to the Internet.

3G Receiver:

This receiver is responsible for obtaining data and files thanks to the connectivity characteristics of the system, also allowing the use of an external modem to provide access to the Internet.

USB Hub:

This receptor is responsible for obtaining data and files thanks to the connectivity characteristics of the system, also allowing the use of an external modem to provide access to the Internet. Unlike the others, the USB receptor allows storage in an external device directly connected with the general system, either via the data bus, or directly from the network controller, as well as the direct connectivity with a multitude of USB devices, compatible with the USB 2.0 standard

DETAILED DESCRIPTION OF THE INVENTION

The device of the present invention contains the following elements: a frame or mount (1) having a curvilinear shape, defined by an anterior frontal face (2), with opaque panels (4), coated in graphite and with an interior modeled in high-impact polyurethane and another counter-frontal posterior face (3); in which the frame is connected in a solidary manner to a set of fixation temples (5) these temples being extensions on each side of the frame (1). The frame contains at least two peripheral visors, an upper visor (6) and a lower visor (7), distant from each other, defining an enclosure (8) together with the concave inner wall of the posterior counter-front face (3) of the frame (1) to include in the enclosure a set of electronic elements defined by a printed circuits central block (11), a cooling block (12), a battery (13), and coolant circulation ducts (14). Collaborating with the aforementioned set of elements, the enclosure also holds: at least one LED screen (15) and a convex lens (16) with a nose support (32) that allows the support of the frame on the user's nose.

The LED (Light Emitting Diode) screen is textured of 32,000,000 colors and 1440×900 pixels, of dimensions 108× 55 millimeters located in the middle of a central printed circuits block (11) that includes: a central processing unit (CPU) with RAM architecture, with a processing speed of 1200 MHz and a hardware interface (motherboard or central integrated circuits block) necessary to process the operations performed by the CPU, performing functions similar to those of the motherboard of a computer, including primary ROM memory, link to the micro SD memory (31) (removable flash), for secondary storage, as well as the links relative to the 3G (25), Wi-Fi (24) and Bluetooth (20) receivers, the on/off switch (23), the USB hub (29), and the digital volume control that is located on the right temple (22). The digital camera (21) is located on the top front central external part of the spectacles and has a capacity of 7 mega pixels and its main function is to record the environment surrounding the user and also allowing the improvement of vision through a zooming system, for a maximum of up to 8 factors of enlargement (8×) and the ability to take pictures by means of a shutter button (18) located in the left sector of the upper visor. These pictures can be stored on the micro SD memory (31) through the graphical interface of the user to a rechargeable, polymer lithium-ion 3.7 V and 900 mA battery (13), that is located on the right, inside the spectacles. The battery is interchangeable through the battery receptacle (19), comprising a pressure sensitive liberating switch, that exposes the top of the battery, so that it can be extracted and replaced manually.

The liquid coolant system that operates through flexible conduits that are 5 to 15 mm in diameter and are made of polyurethane. These conduits pass through the top and bottom of the processing unit. The cooling block (12) is composed of a magnetic copper pump, responsible for pumping the coolant, a copper deposit for the storage and distribution of the dielectric plaque-free coolant with anti-fungal additives, located in the inner left side of the spectacles.

The microphone (17) has a capacity of 50 Hz to 16,000 Hz and an impedance of 2.5 Kilo Ohms. The microphone has 3 slots, 10 mm long by 1 mm in width, to allow the entry of sound (17). This input device captures the vibrations of voice and the environment, converting these vibrations into data through the sound synthesizer and managing the signal level through the volume control. The microphone can be used for recording, communication and interaction with other users through the instant messaging systems contained in the operating system.

In the front left inner bottom part of the spectacles and prior to the location of the battery, it is found a Bluetooth transmitter/receiver (20) with support at 2 DP with a 20 Mbps transfer rate and a range of 10 meters. A HSDP A900/2,100 MegaHertz 3G receiver, 10.2 Mbps, with a WiFi receiver, WLAN 802.11 b/g.

The frame or mount (1) of the spectacles (where the computer is housed) is connected to left and right temples (5) of the spectacles to rest spectacles on the user's ears by means of a temple hook (26), which are detachable and interchangeable from the front section of the spectacles and are attached to the front section through the magnetic attraction of neodymium magnets (10). The external lateral face of the left temple presents a USB hub (29) that is connected to the central processing unit of the spectacles through a multifilament mesh (Flex). In the back sector of the temples, the DCON headphone speakers (28) are found with an impedance of 8 Ohms and a range of 50 to 16,000 Hz. They are connected to the central processing unit via a secondary multifilament mesh (Flex) of copper coated in silicone, in order to receive the electrical impulses generated by the central processing unit and be able to convert them into sound.

A variable distance Zoom system (27) allows the enlargement or reduction of the image obtained from the web camera with a maximum enlargement of 8 factors (8×), providing improved vision and the possibility to focus on distant objects or to take pictures allowing an active participation with objects that fall outside the range of unaided human eyesight.

With respect to the software, the computerized spectacles are equipped with an Android operating system (or similar) in the ROM primary storage unit. This allows the spectacles to transmit and receive data over the Internet, to be used as GPS, to decode the signals and data emitted by the central processing unit (CPU) as well as the reproduction and interpretation, the writing and configuration, of the information in the micro SD flash memory.

The invention allows the use of a rubber foldable keyboard (30) and a rollable mouse pad external to the spectacles, that will transmit the data entered through the keyboard to the spectacles through the Bluetooth system.

Another feature that characterizes the invention is the placement of the visors, distant from one another, with the purpose of forming an enclosure where a set of electronic elements have been placed. These elements include: a central printed circuit block, a cooling block, a battery and coolant circulation conduits. In collaboration with the aforementioned elements, additional elements include: at least one LED screen and a convex lens that is supported on a bridge that rests on the user's nose.

The upper visor prevents the entry of external light to the enclosure and it ensures confidentiality to the user, since it does not allow the screen to be viewed from the outside. The visor allows a perfect visibility of the screen, independently of the luminosity of the environment. The upper visor acts together with the lower visor, keeping the enclosure well ventilated and allowing the user to view the external wireless keyboard. Both visors define an enclosure together with the concave internal counter-front posterior face of the frame. This enclosure allows the placement of the following elements: a central printed circuit block, a cooling block, a battery and coolant circulation conduits; collaborating with the aforementioned elements, we also find at least one LED screen and a convex lens that is supported on a bridge that rests on the user's nose.

In conclusion, the spectacles with a built-in computer, provide the following functionalities:
Digital camera
Sending e-mails
Recorder
Wired and wireless internet access
Webcam
Privacy, avoiding the vision of the screen by another person
Audiovisual synchronization with other devices with similar characteristics
Portability
Movie camera All the aforementioned functions are accomplished without the use of an external computer to perform their expected functions.

It is also important to highlight that with the use of a small, foldable, portable keyboard and communication to an internet server, the user can also obtain the following functionalities:

military soldiers gain the ability to receive orders from their superiors, or to receive the position of the enemy, displaying this information on the screen of the spectacles;

the ability to view, zoom and focus on a screen or whiteboard, for example, during a conference;

the ability to record the view;

the ability to record audio;

the ability to isolate the user by not having interference from external noise (by having the user's ears completely covered by the headset);

the ability to view the screen even when the user is exposed to sunlight, for example on a beach, or to view the screen when the user is exposed to very bright artificial lights;

the ability to view the screen in a 30, 40 or 50 inch size;

the ease and practicality to wear the spectacles;

the ability to connect to a wireless mouse to facilitate the movement of the pointer in case the user does not feel comfortable using a mouse pad;

the ease of writing without having to press tiny buttons or by pressing them 2, 3 or 4 times until you see the letter that you want to write;

the speed of typing;

the hands-free operation (if it is operated by voice recognition system);

the ability to connect to 110/220 volts through the USB port;

the ability to participate in a staff meeting, all members having the ability to receive equal or different sounds and images among them, all at the same time;

the ability of members of a political party that are on vacation at the beach, for example, to attend a meeting when summoned by the President, by putting on their spectacles and connecting with each other, wherever they are and write whatever they want, easily, viewing the screen clearly and operating it quickly;

the ability to connect with networks and instant messaging systems, via WiFi, from anywhere and to be able to show others, what the user is seeing on the outside, having the possibility of a videoconference; and the ability to host a conference where the speaker and the attendants have the spectacles on.

Having described and determined the nature of the invention and the way in which it can be carried into practice in its fundamental idea, the inventor claims, as an invention and exclusive property, the following:

1. A spectacles with a built-in computer comprising:
    a frame having a first end, a second end, an upper end, a lower end, a curvilinear shape, a frontal face having panels made from a high impact polyurethane coated with graphite, a back face located opposite to the frontal face;
    an upper visor connected perpendicular to the upper end of the frame;
    a lower visor connected perpendicular to the lower end of the frame, the upper visor is located parallel and distant from the lower visor;
    an enclosure defined by the upper visor, the lower visor, and an internal concave wall of the back face of the frame;
    the enclosure encasing:
    a central printed circuit block including a first side, a second side, a top end, a bottom end, a RAM memory, a motherboard, a ROM storage unit having a software program, a micro SD memory, and links to a Wi-Fi, Bluetooth receivers, and USB hub;
    a cooling block located on the first side of the central printed circuit block;
    a battery located on the second side of the central printed circuit block;
    coolant circulation ducts connected to the cooling block, the coolant circulating blocks are made of flexible polyurethane, the flexible polyurethane conduits pass through a top end and a bottom end of the printed circuit block;
    at least one LED screen, the LED screen is placed against the central printed circuit block, the cooling block, the battery, and the coolant circulation ducts, each LED screen is operatively connected to the central printed circuit block, the cooling block, the battery, and the coolant circulation ducts;
    a convex lens placed against the at least one LED screen, the convex lens having a nose support;
    a first temple secured to the first end of the frame;
    a second temple secured to the second end of the frame;
    wherein the first temple and the second temple include a receptacle that houses a speaker with a volume control, a zoom control, a USB port, a fixation hook designed to secure the temple to an ear of a user.

2. The spectacles with a built-in computer according to claim 1, wherein the frontal face contains at least one of a webcam, a microphone, a Bluetooth receiver antenna, a 3G receiving antenna, a WiFi receiving antenna, and an on/off switch.

3. The spectacles with a built-in computer according to claim 1, wherein the upper visor has at least one of a camera shutter button, a battery receptacle, and a micro SD memory slot.

4. The spectacles with a built-in computer according to claim 1, wherein the LED screen is of 32,000,000 colors and 1440×900 pixels.

5. The spectacles with a built-in computer according to claim 1, wherein the cooling block comprises a magnetic copper pump that pumps a coolant flow, a copper deposit for the storage and distribution of a dielectric coolant.

6. The spectacles with a built-in computer according to claim 1, wherein the digital camera has a capacity of at least 7 megapixels.

7. The spectacles with a built-in computer, according to claim 1, wherein each temple is attached to the frame by using neodymium magnets.

8. A spectacles with a built-in computer comprising:
    a frame having a first end, a second end, an upper end, a lower end, a curvilinear shape, a frontal face having panels made from a high impact polyurethane material coated with graphite, a back face opposite located to the frontal face and having a convexity;
    a lateral, an upper visor connected perpendicular to the upper end of the frame;
    a lower visor connected perpendicular to the lower end of the frame, the upper visor is located parallel and distant from the lower visor;
    defining an enclosure defined by the upper visor, the lower visor, and with an internal concave wall of the back face of the frame;
    the enclosure encasing:
    a central printed circuit block including a first side, a second side, a top end, a bottom end;
    a cooling block located on the first side of the central printed circuit block;
    a battery located on the second side of the central printed circuit block;
    coolant circulation ducts encased on the enclosure connected to the cooling block, the coolant circulating blocks are made of flexible polyurethane;

at least one LED screen display located on the enclosure, the LED screen is placed against the central printed circuit block, the cooling block, the battery, and the coolant circulation ducts, each LED screen is operatively connected to the central printed circuit block, the cooling block, the battery, and the coolant circulation ducts;

a convex lens having a shape that matches the internal concave wall of the back face of the frame, the convex lens is placed against the at least one LED screen located on the enclosure, the convex lens having a nose support;

a first temple secured to the first end of the frame;

a second temple secured to the second end of the frame;

wherein the first temple and the second temple include a receptacle that houses a speaker with a volume control, a zoom control, a USB port, a fixation hook designed to secure the temple to an ear of a user.

* * * * *